Figure 6:
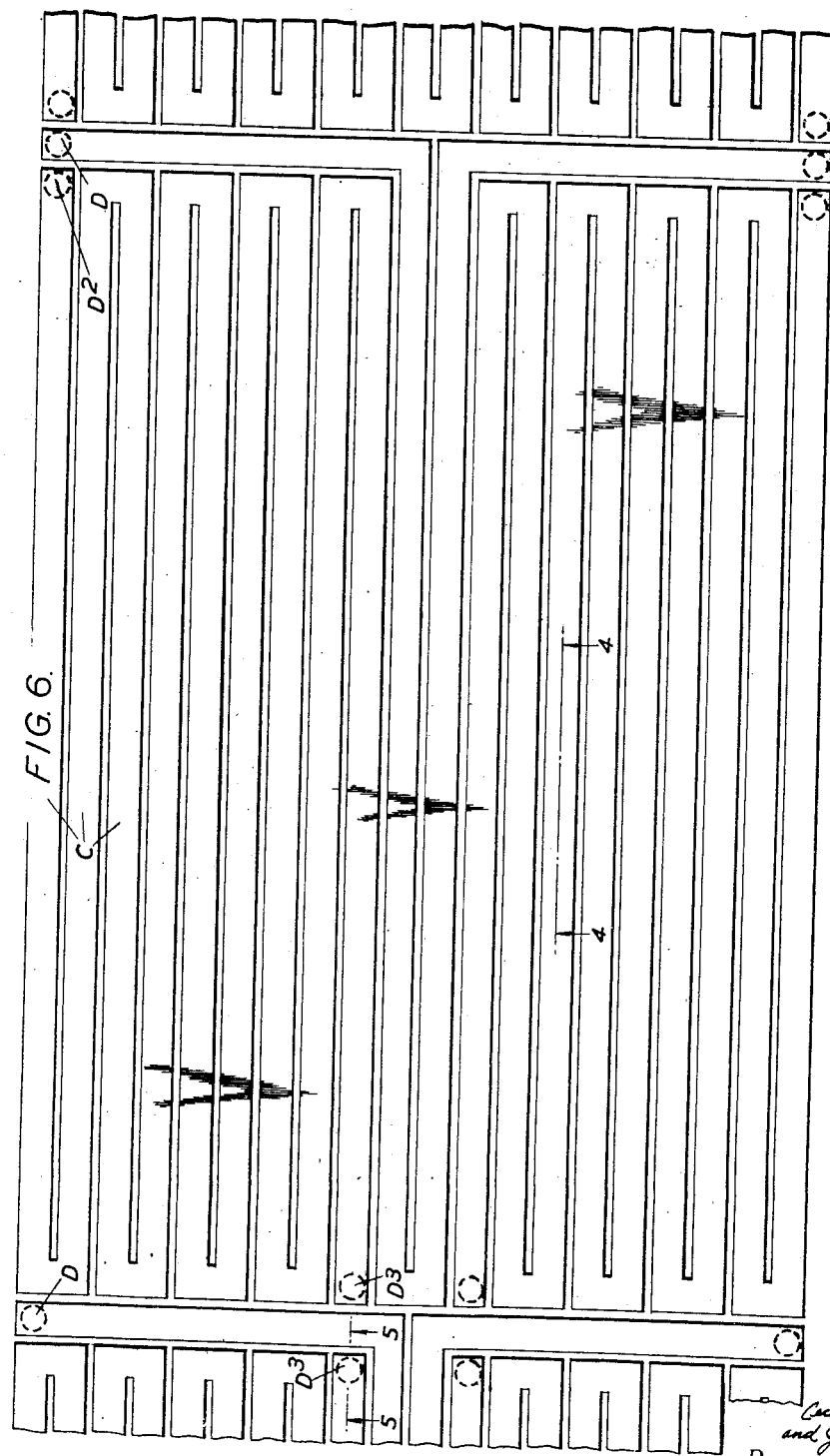

May 7, 1957 C. L. COWDREY ET AL 2,791,668
ELECTRICALLY HEATED DE-ICING OR ANTI-FREEZING APPARATUS
Filed Aug. 18, 1952 4 Sheets-Sheet 1
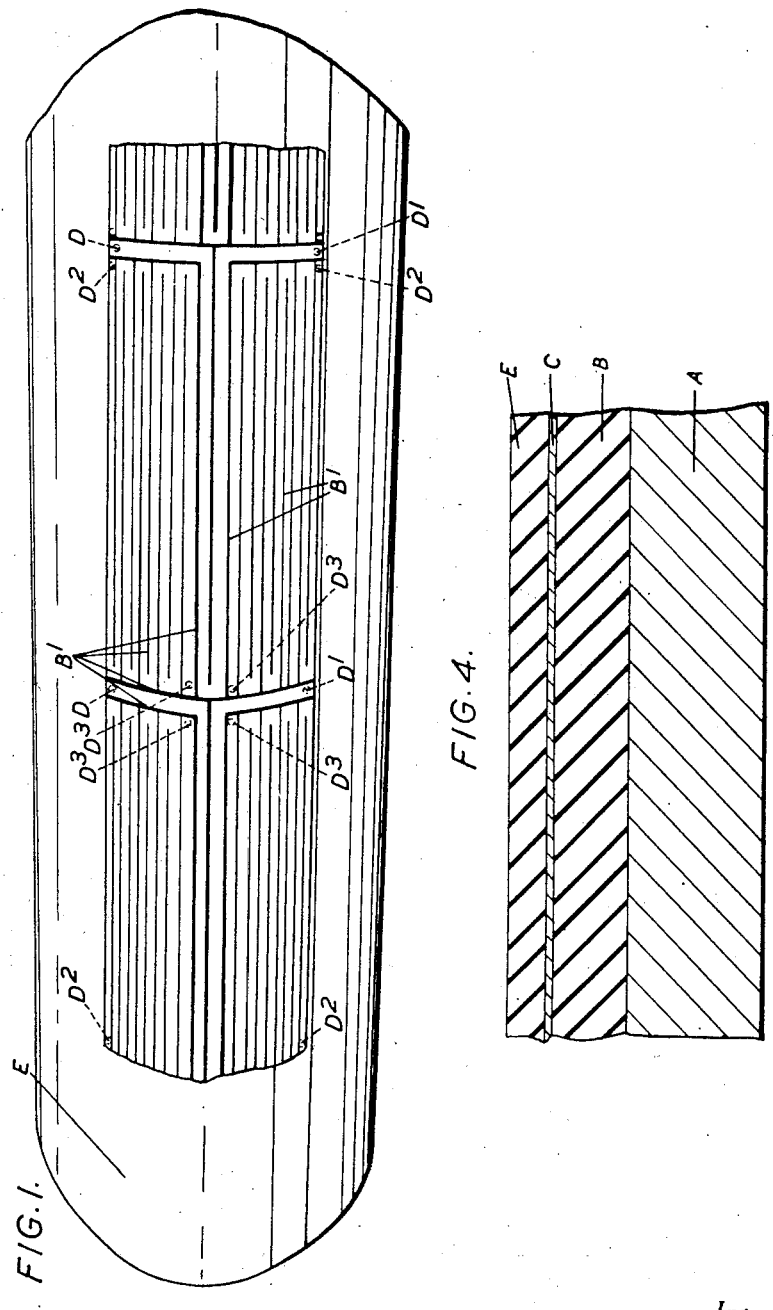
Inventors
Cecil L. Cowdrey
John J. Kinsella
By Watson Cole Grindle
 + Watson
Attorneys May 7, 1957  C. L. COWDREY ET AL  2,791,668
ELECTRICALLY HEATED DE-ICING OR ANTI-FREEZING APPARATUS
Filed Aug. 18, 1952  4 Sheets-Sheet 2
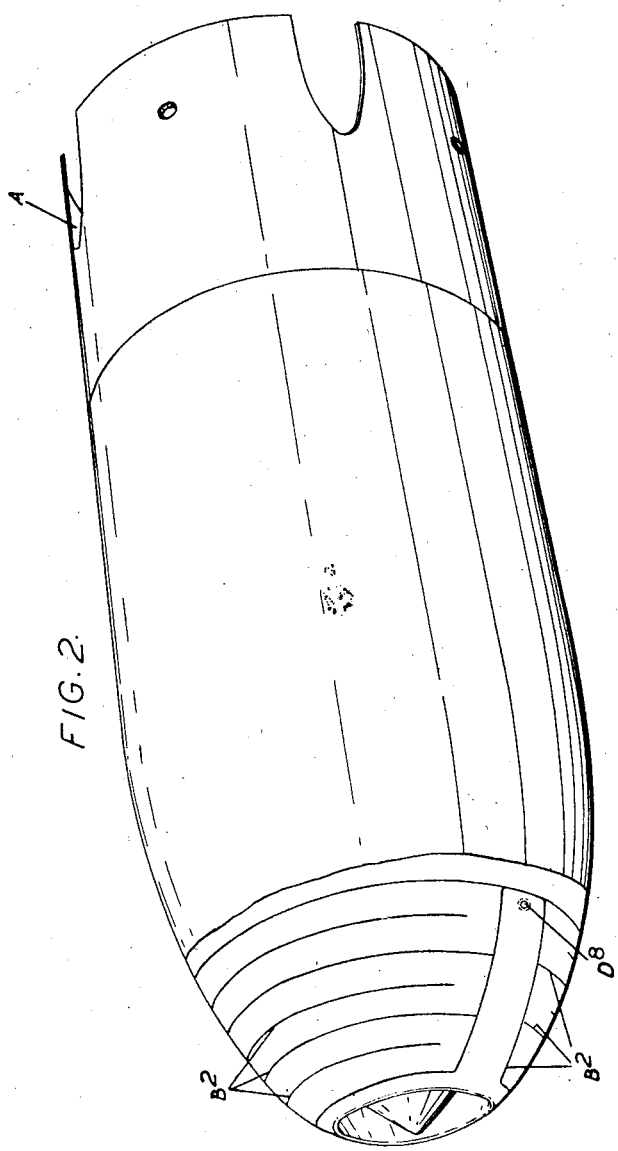

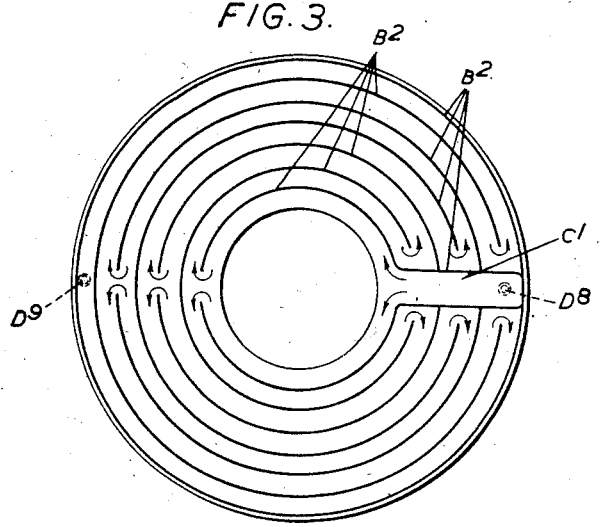
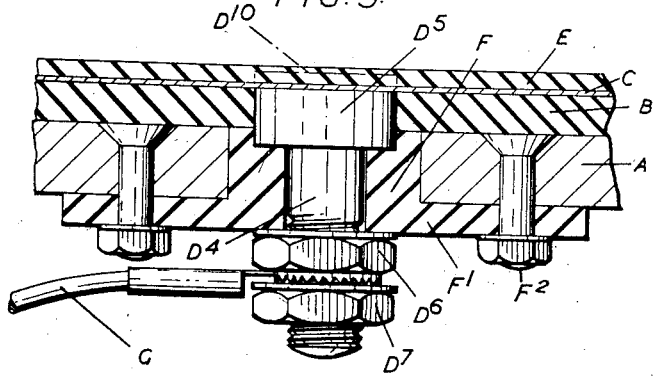

May 7, 1957 C. L. COWDREY ET AL 2,791,668
ELECTRICALLY HEATED DE-ICING OR ANTI-FREEZING APPARATUS
Filed Aug. 18, 1952 4 Sheets-Sheet 4

Inventors
Cecil Louis Cowdrey
and John Kinsella
By
Watson, Cole, Grindle & Watson
Attorneys

United States Patent Office 2,791,668
Patented May 7, 1957

2,791,668

ELECTRICALLY HEATED DE-ICING OR ANTI-FREEZING APPARATUS

Cecil Louis Cowdrey, St. Albans, and John Kinsella, Luton, England, assignors to D. Napier & Son Limited, London, England, a company of Great Britain Application August 18, 1952, Serial No. 304,964

Claims priority, application Great Britain August 21, 1951

20 Claims. (Cl. 219—19)

This invention relates to electrically heated de-icing or anti-freezing apparatus and is especially but not exclusively applicable to the parts of aircraft. It will be understood that in the following specification and claims the term de-icing is used to include both the prevention of ice formation and the removal of ice.

While de-icing apparatus of the above kind has been proposed and experiments with various forms of such apparatus have been carried on for some time, it has not yet been brought into successful commercial use owing mainly to the fact that prior proposals have not met to a sufficient degree the requirements of ease of application on a commercial scale, durability and ease of repair.

An object of the present invention is to provide a form of electrically heated anti-freezing or de-icing apparatus of the kind referred to and a method of forming such apparatus which will to a large degree meet practical requirements.

According to the present invention, the method of producing electrical de-icing apparatus of the kind referred to includes first applying to the surface of the article or part to be dealt with an inner layer of an electrical insulating thermo-setting artificial resin or like thermo-setting plastic material, then applying a layer of metal by metal spraying to form an electrical resistance element, and then applying an outer layer of electrical insulating material in the form of a thermo-setting artificial resin or like thermo-setting plastic material, and curing the layers of thermo-setting plastic material.

Preferably the inner layer of thermo-setting plastic material is cured before application of the metal layer and care must therefore be taken to ensure that during the subsequent curing of the outer layer of thermo-setting plastic material the inner layer is not caused to deteriorate by excessive curing.

It is found that by the selection of a suitable artificial thermo-setting resin or like thermo-setting plastic material both the required insulating properties and an outer layer having the required durability and resistance to abrasion are obtained. Moreover, after the plastic material has been cured, it is substantially unaffected by the temperatures to which it may be subject.

In some cases the thermo-setting resin or like plastic material may be of a kind which if left long enough will cure itself at normal atmospheric temperatures, but in most cases it will be of a kind which requires to be brought to an elevated temperature for a predetermined period for curing purposes.

The thermo-setting resin or like plastic material may be applied in various ways but in a preferred application of the invention a thermo-setting resin is applied by spraying with a flame type gun, that is to say a gun through which the resin is delivered together with two gases which burn together so that the resin is softened by the flame and delivered in a series of softened droplets which coalesce upon the surface.

Where as will usually be the case, heat for curing purposes is applied to each of the resin layers after application this may be applied for example by means of radiant heaters or by enclosing the part to be heated in an appropriate heating box or moreover in some cases the outer layer may be cured by applying an appropriate electric current to the metallic layer so that it acts as a resistance heater by which the required curing temperature is applied to the layer. A similar method of curing both layers might be used, if the curing of both layers is effected simultaneously after application.

Generally speaking it will be found necessary or desirable after application and curing of the first layer of thermo-setting resin to rub this down to give it a smooth surface before applying the metallic layer. Moreover during application of the metallic layer it may be tested for resistance and uniformity from time to time and the application adjusted so as to give it a desired resistance and degree of uniformity. In this connection it is found in practice that assuming, as usually will be the case, that the metal layer is applied through a stencil or through a screen formed for example by covering certain parts of the total surface with tape or the like, a resistance of approximately the required value can be obtained by measuring the resistance after passing the spray gun over the surface a predetermined number of times and then adding further sprayed metal by passing the spray down again over such part or parts as may require it to reduce the resistance to the set value.

The outer protective layer of synthetic resin, which may be applied in one or more coats is also preferably rubbed down smooth after final application and curing the number of coats applied and the rubbing down operation being such as to eliminate substantially any additional thickness there the metal layer lies.

Where, as will usually be the case, the surface to which the electrically heated de-icing apparatus is to be applied is a metal surface, for example the surface of an aircraft wing, or control member, it may be desirable to roughen the metal surface slightly as by the use of emery cloth or light sand blasting preferably after degreasing before applying the inner layer of insulating material thereto while further it may be desirable slightly to roughen the surface of the inner layer of insulating material after curing as by means of a rasp before applying the metal layer so as to improve the adherence of the metal to the plastic material.

Difficulty may be experienced in certain cases due to a tendency for the plastic material to "run" during the curing process where heat curing is used and, according to a further feature of the invention, this may be reduced by mixing the plastic material with a filling agent such as finely powdered mica or other material which is sufficiently temperature resistant and does not itself soften with heat. Such expedient may be unnecessary in cases where the plastic material is of a suitable kind and/or where rapid curing, as by means of radiant lamps can be used.

In some cases also steps may be taken to reduce the tendency for heat transfer from the metallic layer through the under layer of plastic material to the surface of the aircraft part as for example by making the under layer of plastic material considerably thicker than the outer layer.

Two examples of applications of the invention to aircraft parts, are however, shown somewhat diagrammatically by way of example in the accompaning drawings, in which—

Figure 1 is a front elevation of part of the leading edge of an aircraft wing having the invention applied to it but with a section of the outer layer of insulating material removed, Figure 2 is a perspective view of a nose fairing for the air entry of a combustion turbine for aircraft propulsion purposes having the invention applied to it but with the outer layer of insulating material omitted, Figure 3 is a front elevation of the nose fairing shown in Figure 2, Figure 4 is a cross section on a much enlarged scale taken on line 4—4 of Figure 6, Figure 5 is a cross-section taken on line 5—5 of Figure 6, and Figure 6 is a view similar to Figure 1 but on an enlarged scale.

In the construction shown in Figures 1 and 6, the wing has a metal skin, which is shown at A in Figures 4 and 5.

On this skin is applied a layer of thermo-setting resin B of the kind shown as "Araldite" with which is mixed powdered mica as hereinafter described. This layer is then cured and preferably rubbed down smooth. On the layer B of insulating material is then applied by spraying a metallic layer C, this layer being discontinuous in the sense that it is divided into a considerable number of strips separated from one another by lines $B^1$, along which there is no metal and which for convenience will therefore be termed insulating lines. These lines are shown on Figure 1 in which however, only some of them are directly identified by the reference letter $B^1$. As will be apparent, adjacent strips of the metallic layer are connected to one another at their ends where appropriate in such a manner that each of a number of areas of the total surface to which the invention is applied is substantially covered by a series of metal strips connected to one another electrically in series to form a meandering electrical path therethrough.

Over the metallic layer C is applied a layer E of insulating thermo-setting material which also preferably consists of "Araldite" mixed with a proportion of powdered mica as hereinafter described, this layer then being cured.

In order to enable electric current to be passed through each of the electrical paths constituted by a series of strips of the metallic layer C as above described, an electric terminal is arranged at each end of each of these paths, as indicated at D, $D^1$, $D^2$, $D^3$. The construction and arrangement of each of these terminals is shown in Figure 5 from which it will be seen that the terminal comprises a screwthreaded pin $D^4$ which is passed through an insulating bushing F disposed in an aperture in the skin A and having a flange $F^1$ at its inner end, the pin $D^4$ having a head $D^5$ at one end and a pair of nuts $D^6$, $D^7$ at its other end one of which acts to clamp the pin $D^4$ in place within the bush F while the other serves to secure the end of an electrical conductor G to the pin. The flange $F^1$ is secured to the metal skin A by means of bolts $F^2$.

As will be seen the head $D^5$ projects above the outer face of the metal skin A by an amount equal to the thickness of the inner insulating layer B, and the metallic layer C extends over the outer face of the head $D^5$ so as to be electrically connected to it. Thus each of the appropriate points in the metallic layer C is connected by a terminal to an electrical conductor G without any appreciable bulge being formed in the outer surface of the outer layer E.

In the alternative application of the invention shown in Figures 2 and 3 the general arrangement of the layers and of the terminals would be the same as is above described with reference to Figures 4 and 5 and Figures 4 and 5 may thus be regarded equally as representing cross sections through the nose fairing shown in Figures 2 and 3 in planes normal to the outer surface of that fairing.

The nose fairing thus comprises an inner metallic shell A of streamlined form to which is applied the inner layer of thermo-setting insulating material B, to which after curing such inner layer is, in turn applied the metallic layer C with the outer layer of thermo-setting insulating material E applied over it and then cured. In this case the metallic layer is split up into a series of strips with insulating lines between them as shown at $B^2$, these lines extending circumferentially as shown but each being circumferentially incomplete so that the strips bounded by the lines form a pair of parallel paths for the passage of electrical current, as indicated by arrows, each path comprising the parts of the strips lying in one circumferential half of the fairing. In order to provide for a symmetrical arrangement of the terminals in the fairing a longitudinal strip $C^1$ forms a connection between the centre of the length of the circumferential strip nearest the front of the nose fairing and a point adjacent to the centre of the most rearward circumferential strip.

Terminals $D^8$ and $D^9$ constructed and arranged as shown in Figure 5 are thus arranged respectively at the rearmost end of the strip $C^1$ and at a diametrically opposite point in the rearmost circumferential strip of the metallic layer, thus providing the two parallel paths for electric current indicated by the arrows and referred to above.

The method according to the invention employed for producing heating apparatus according to the invention as shown in the drawings and above described may be as follows.

The outer surface of the skin A is first lightly roughened by a non-metallic abrasive and the surface rendered free from grease, as by use of some known degreasing substance. The terminals are inserted in place in the skin as shown in Figure 5, the height of the head of each terminal being, however, initially as indicated at $D^{10}$ in dotted lines.

An intimate mixture of three parts by weight of the thermo-setting insulating material known as "Araldite Type 1 Natural" in powder form (obtainable in the United States from Ciba Co., Inc., of 627 Greenwich Street, New York 14, New York), and one part by weight of powdered mica, each of which has passed through a British Standards sieve No. 72 and been retained in a British Standards sieve No. 150, is then applied to the surface of the skin A by a flame type spraying gun, for example a gun of the Scheri type, to a thickness of between 0.02 inch and 0.04 inch, this layer preferably being applied to a thickness slightly greater than that finally required. This layer is then cured for approximately one hour at a temperature of between 170° C. and 190° C. and is then rubbed down smooth to its final thickness, while in any case the layer of material thus applied over the head $D^5$ of each of the terminals is rubbed down to a level below the level of the original upper face $D^{10}$ of the terminal and the upper face of the terminal is simultaneously similarly rubbed down in this process so that this face is exposed and lies in the same plane as the surrounding outer surface of the layer B.

A layer of aluminium is then applied to the surface of the cured insulating layer by a flame-spraying gun, the metal being substantially pure, that is to say preferably at least 99.4% pure before spraying, this application also preferably being by means of a flame type spraying gun of the Scheri type, using dry powdered aluminium which has passed through a British Standards sieve No. 72 and then retained in a British Standards sieve No. 150.

The insulating lines $B^1$ and $B^2$ may be provided during this operation by placing a suitable mask over the surface before the metal is applied thereto so as to prevent application of metal where the insulating lines $B^1$ and $B^2$ are required. Alternatively the whole surface may be sprayed, and in this case the insulating lines $B^1$, $B^2$ are subsequently formed by cutting through the metal surface mechanically or by hand so as to expose the surface of the base insulating layer B.

In any case the different parts of the metal layer may be tested for thickness by testing for electrical resistance and the thickness and hence the resistance adjusted appropriately by application of additional metal where required so as to provide also for the required total resistance in each of the paths through which the current is to flow between terminals.

After application of the metal layer and formation of the insulating lines the outer insulating and protective layer E is applied, this application being again effected by a flame type spraying gun employing a mixture of three parts by weight of "Araldite Type 1 Natural" powder and one part by weight of powdered mica of the same range of particle sizes as is used for the base insulating layer B.

This outer insulating and protective layer D is applied to a thickness such that after curing and the further finishing operation described below its thickness shall lie between .009 inch and .012 inch.

Thus, after application of the outer insulating and protective layer E as described above it is cured for approximately one hour at a temperature of between 170 and 190° C. and its outer surface is then rubbed down to a smooth finish and lightly polished, care being taken to ensure that the final thickness, particularly over the terminals, shall lie between the figures of .009 inch and .012 inch mentioned above.

If desired the curing time of each insulating layer may be increased from that indicated above but in no circumstances should it be more than 20 hours when employing "Araldite Type 1 Natural" powder as described above if the best properties of the insulating layers are to be retained.

The application of the various layers may be effected by hand operation of the spraying gun in the hands of an experienced operator, who it has been found learns by experience the speed of movement, number of sweeps of the gun, distance of the gun from the surface and other factors necessary to produce a substantially uniform layer of the desired thickness with a reasonable degree of accuracy, so that for surfaces where such hand application is convenient this represents a satisfactory method of carrying the invention into practice.

In other cases, where the type of surface to which the invention is to be applied permits, the application of the layers may be effected under mechanical control as by mounting the spraying gun and the article to which the invention is to be applied on supports at least one of which is arranged to be mechanically driven and moving the support gun relatively to one another in a predetermined manner and at a predetermined relative speed which experience and tests have shown to produce layers of the required thickness.

For example, in applying the invention to a fairing such as that shown in Figures 2 and 3, the fairing could be mounted upon a mechanically driven rotatable head and during the application of each layer revolved at a predetermined speed, while the spraying gun is mounted upon a support which travels in a predetermined path in a generally axial direction and at a predetermined speed, which may be automatically varied according to some predetermined law as to apply an approximately even thickness of coating to the surface of the fairing.

It will be appreciated that the particular materials employed for the insulating layers and for the metallic layer in the example given above are given by way of example only and that the type of insulating thermosetting material used for the insulating layers and the type of metal used for the metal layer may vary, suitable variations being similarly made as required in the times of curing, and the thicknesses of the metal and other layers to suit requirements and the materials used. Thus instead of using aluminium as the metal, a metal or alloy of relatively low conductivity may be used, thus allowing thicker layers and/or wider strips to be used for a given electrical resistance.

It will be apparent, however, that in every case the final heating apparatus comprises layers of cured thermo-setting insulating material with conducting layers of metal applied by a spraying gun between them, and with the insulating layers united to one another through the insulating "lines" in the metal layer.

Thus the invention is readily applicable to surfaces of a wide variety of contours including surfaces of compound curvature such as are met with in aircraft and moreover the thermo-setting plastic material can be of a nature which is strongly resistant to abrasion so that the outer layer will be well suited to resist the water and like abrasion to which the leading edges of aircraft parts exposed to an air stream are subject. Further the thermo-setting plastic material after being cured is well suited to withstand any temperature to which it may be subjected by the metal layer should the apparatus be in operation under conditions in which its temperature may rise substantially above that at which it would be maintained during icing conditions by the cooling effect of such conditions.

Preferably, as shown in the drawings, the base insulating layer B is thicker than the protective outer insulating layer E since this tends to reduce the conduction of heat from the metal layer C to the metal skin A and thus to increase the heat transmitted to the surface of the outer protective insulating layer E for the removal or prevention of ice formation thereon.

It will be apparent that when the invention is applied to the leading portion of an aircraft wing, or control surface, as shown for example in Figure 1 of the drawings, the complete electrical de-icing apparatus including the invention may be of the kind forming the subject of United States Patent No. 2,590,944 in which case the terminal D and $D^1$ will during operation of the apparatus be continuously connected to the source of electric current while the various pairs of terminals $D^2$, $D^3$ will be connected to the source of electric current at predetermined time intervals as described in the specification of the above patent.

What we claim as our invention and desire to secure by Letters Patent is:

1. A method of producing electrically heated de-icing or anti-freezing apparatus of the kind referred to, including first applying to the surface of the article or part to be dealt with an inner layer of an electrical insulating thermo-setting plastic material, applying a layer of metal by hot metal spraying to form an electrical resistance element, applying an outer layer of electrical insulating material in the form of a thermo-setting plastic material and curing the layers of thermo-setting material.

2. A method of producing electrically heated de-icing or anti-freezing apparatus for aircraft, including first applying to the surface of the aircraft article or part to be dealt with an inner layer of an electrical insulating thermo-setting plastic material intimately mixed with insulating material in powdered form which will not be rendered plastic during the curing process, applying a layer of metal by metal spraying to form an electrical resistance element, applying an outer layer of electrical insulating material in the form of a thermosetting plastic material intimately mixed with insulating material in powdered form which will not be rendered plastic during the curing process, and curing the layers of thermosetting material.

3. The method of claim 2 in which each of the layers of thermosetting plastic material is applied by spraying with a flame type spraying gun.

4. The method of claim 3 in which the mixture of thermosetting plastic material and powdered insulating material consists of approximately three parts by weight of thermosetting plastic material to one part by weight of powdered mica.

5. A method of producing electrically heated de-icing or anti-freezing apparatus of the kind referred to, including first applying to the surface of the article or part to be dealt with an inner relatively thick layer of an electrical insulating thermo-setting plastic material, curing such inner layer then applying a layer of metal by hot metal spraying to form an electrical resistance element, and then applying an outer relatively thin layer of an electrical insulating thermo-setting plastic material and then curing the outer layer of thermo-setting plastic material.

6. A method of producing electrically heated de-icing or anti-freezing apparatus for aircraft, including first applying to the surface of the aircraft article or part to be dealt with an inner layer of an electrically insulating thermosetting plastic material intimately mixed with powdered insulating material which will not be rendered plastic during the following curing operations, then curing said inner layer, then applying to said cured inner layer a layer of metal by metal spraying to form an electrical resistance element, then applying an outer layer of electrical insulating thermosetting plastic material intimately mixed with powdered insulating material which will not be rendered plastic during the following curing operation, and then curing said outer layer.

7. The method of claim 6 in which the mixture of thermosetting plastic material and powdered insulating material consists of approximately three parts by weight of thermosetting plastic material and one part by weight of powdered mica.

8. The method of claim 6 as applied to a metallic aircraft surface in which before applying the inner layer of thermosetting plastic material to said surface the metallic surface is lightly roughened.

9. The method of claim 6 in which the thermosetting plastic material used for the inner and outer layers is fabricated from a thermosetting resin comprising the reaction product of a dehydricphenol and epichlorhydrin.

10. The method of claim 9 in which the thermosetting plastic material is applied by spraying with a flame gun and before spraying is in the form of a powder capable of passing through a British Standard No. 72 sieve but not through a British Standard No. 105 sieve.

11. The method of claim 10 in which the powdered thermosetting plastic material is intimately mixed with mica in powdered form also capable of passing through a British Standard No. 72 sieve but not capable of passing through a British Standard No. 105 sieve.

12. Electrically heated de-icing or anti-freezing apparatus comprising a metallic supporting surface, inner and outer layers of cured electrical insulating thermosetting plastic material incorporating finely divided insulating material the inner layer of which is united to the supporting surface and applied thereto in liquid form, a metallic layer constituting an electrical resistance heating element interposed between the inner and outer layers of cured plastic material and consisting of a mass of coagulated and interconnected metallic particles applied to the inner layer in liquid form, said outer layer being applied to the metallic layer in liquid form, a source of electricity, and terminals carried by the supporting surface and electrically connected to said source and in intimate electrical contact with spaced points in the metallic layer for the passage of electric current through said metallic layer.

13. The apparatus of claim 12 in which the finely divided insulating material is mica.

14. The apparatus of claim 13 in which the finely divided insulating material is present in the cured thermosetting plastic material in approximately the proportion of one part by weight of finely divided insulating material to three parts by weight of thermosetting plastic material.

15. The apparatus of claim 14 in which the cured thermosetting insulating material is fabricated from a thermosetting resin comprising the reaction product of a dehydricphenol and epichlorhydrin.

16. Electrically heated de-icing or anti-freezing apparatus comprising a supporting surface, inner and outer layers of cured electrical insulating thermosetting plastic material fabricated from a thermosetting resin comprising the reaction product of a dehydricphenol and epichlorhydrin, the inner layer of which is united to the supporting surface, a metallic layer constituting an electrical resistance heating element interposed between the inner and outer layers of cured plastic material and consisting of a mass of coagulated and interconnected metallic particles, and terminals carried by the supporting surface and in intimate electrical contact with spaced points in the metallic layer for the passage of electric current through said metallic layer.

17. A method of producing electrically heated de-icing or anti-freezing apparatus of the kind referred to, including first applying to the surface of the article or part to be dealt with an inner layer of an electrically insulating thermosetting plastic material, then curing said inner layer, rubbing down said inner plastic layer to render it smooth after curing then applying to said cured inner layer a layer of metal by metal spraying to form an electrical resistance element, then applying an outer layer of electrical insulating thermosetting plastic material, then curing said outer layer and rubbing down said outer plastic layer to render it smooth after curing.

18. A method of producing electrically heated de-icing or anti-freezing apparatus of the kind referred to, including first applying to the surface of the article or part to be dealt with an inner layer of an electrically insulating thermo-setting plastic material, then curing said inner layer, then applying to said cured inner layer a layer of metal by hot metal spraying to form an electrical resistance element, then applying an outer layer of electrical insulating thermo-setting plastic material, and then curing said outer layer.

19. A method of producing electrical de-icing or anti-freezing apparatus as claimed in claim 18 on a metal surface according to which before applying the inner layer of thermo-setting plastic material to the metal surface the metal surface is lightly roughened.

20. A method of producing electrically heated de-icing or anti-freezing apparatus as claimed in claim 18, in which the inner layer of plastic material is cured before applying the metal layer and the metal layer is applied over the whole area of the inner layer of plastic material to be dealt with and including the step of removing parts of the metal layer along lines leaving a series of narrow strip like metal paths for the passage of electric current, before applying the outer layer of thermo-setting plastic material.

References Cited in the file of this patent

UNITED STATES PATENTS

| 1,102,633 | Aylsworth | July 7, 1914 |
| 1,943,062 | Driscoll | Jan. 9, 1934 |
| 2,205,543 | Rideau et al. | June 25, 1940 |
| 2,375,669 | McKinney | May 8, 1945 |
| 2,398,108 | Mott | Apr. 9, 1946 |
| 2,410,225 | Macht | Oct. 29, 1946 |
| 2,590,944 | Cowdrey et al. | Apr. 1, 1952 |
| 2,665,090 | Holdaway et al. | Jan. 5, 1954 |
| 2,685,634 | Bartlowe | Aug. 3, 1954 |
| 2,690,890 | Weeks | Oct. 5, 1954 |
| 2,721,152 | Hopf et al. | Oct. 18, 1955 |
| 2,721,153 | Hopf et al. | Oct. 18, 1955 |

FOREIGN PATENTS

| 224,648 | Great Britain | Nov. 20, 1924 |
| 853,799 | France | Dec. 16, 1939 |
| 935,233 | France | Feb. 2, 1948 |

OTHER REFERENCES

Bass et al.: Proceedings of The I. R. E., July 1945 (pp. 441–447).

"New Advances in Printed Circuits," United States Dept. of Commerce, National Bureau of Standards, Miscellaneous Publication 192, issued Nov. 22, 1948, pages 1, 43.